UNITED STATES PATENT OFFICE.

KARL GOLDSCHMIDT AND JOSEF WEBER, OF ESSEN-ON-THE-RUHR, GERMANY, ASSIGNORS TO THE FIRM OF TH. GOLDSCHMIDT, OF ESSEN-ON-THE-RUHR, GERMANY.

PROCESS OF DETINNING TIN-SCRAPS, &c.

No. 836,496. Specification of Letters Patent. Patented Nov. 20, 1906.

Application filed June 29, 1905. Serial No. 267,581.

*To all whom it may concern:*

Be it known that we, KARL GOLDSCHMIDT and JOSEF WEBER, chemists, subjects of the King of Prussia, German Emperor, and residents of Essen-on-the-Ruhr, in the German Empire, have jointly invented certain new and useful Improvements in the Processes of the Recovery of Detinned Sheet-Iron from Tin-Scraps or Tin-Plates, of which the following is an exact specification.

The known processes for the recovery of tin from tin-plate waste by means of acids, acid salts, or chlorin do not leave the sheet-iron with a permanently-clean surface. Whether the separation of the tin is effected by known processes purely chemically or electrolytically, the surface of the sheet metal treated is corroded or will easily corrode and though subjected to a washing process is extremely liable to rust subsequently, so that the sheet-iron is of little use, or at least greatly reduced in value for treatment in Siemens-Martin hearth-furnaces. On the other hand, it is known that in alkaline processes the sheet-iron receives the desired bright and clean non-corroding surface. This is the reason why the alkaline processes are preferably used at present for the purpose, though much more cumbersome and expensive than those based on acids.

It has now been discovered by us that it is possible to obtain the sheet-iron with a bright steel-gray surface by chemical treatment if the tin-plate is treated with chlorin gas in a dry process to be further described and that the clean and bright surface of the detinned tin-scraps may be maintained and the detinned tin-scraps protected against rusting by the following process: When the detinning of the tin-scraps being finished, it is necessary to remove completely the chlorin gas which is still in the detinning vessel and which is in contact with the detinned surfaces of the scraps. It is further necessary to completely remove the chlorid of tin and the gases of chlorid of tin which are still in contact with the surfaces of the tin-scraps or which are in the vessel in which the detinning process had taken place. This is effected by diminishing the pressure in the receptacle or vessel in which the detinning process had been finished. The vessel is evacuated by an air-pump, and so the residue of the chlorid-of-tin gases and of the chlorin gases is removed by this ventilating or exhausting process. The detinned tin-scraps are perfectly free from those materials. They are subjected to a washing process with water, whereby the chlorid of iron which is formed on the surfaces of the detinned tin-scraps by the above-described detinning process is removed.

We will now completely describe our process.

The tin-scraps are first submitted in a suitable receptacle of brickwork, stone, iron, and the like to the action of dry chlorin vapors, preferably in a closed apparatus. Care is taken that the chlorin acts on the tin-plate in a weak or diluted condition, and we use the tin-scraps preferably in mechanically-compressed condition, because this has the advantage when carrying out the process on a large scale that vessels of comparatively small dimensions can receive a large quantity of waste, and it has been found that the close packing of the numerous pieces of tin-plate waste does not prevent the complete recovery of the tin and the production of bright non-corroding sheet-iron waste in the whole process hereinafter described.

The chlorin process is carried out as a dry process and is conducted in such a manner that as far as possible anhydrous chlorid of tin is produced free from iron, and the temperature of the tin-plate waste is kept as low as possible. After this tin-separation process the last remnants of chlorid of tin are removed from the apparatus through clearing the latter by placing it under a vacuum. This sheet-iron waste freed from the tin is now free from the adhering remains of the chlorid-of-tin vapors by the ventilating or exhausting process; but a firmly-adhering thin layer of chlorid of iron has been formed on the sheet-iron waste, though the process has been carried out in a dry manner. This thin layer of chlorid of iron results, in our opinion, from an intermediate layer existing between the actual sheet-iron and the layer of tin on the tin-plates and which may be a kind of alloy of iron and tin. Therefore while the outer layer of pure tin is entirely dissolved by the chlorination process and while the iron is not attacked by this dry process in which weak chlorin gas is used the layer of alloy is affected, which explains, in our opinion, the presence of chlorid of iron on the waste from which the tin has been separated. This remaining layer or the particles of chlorid of iron are the cause of the subsequent corrosion of the treated sheet-iron waste which has been obtained by the separation process with a bright steel-gray surface. This chlorid of iron can now be removed by a washing process with water without danger that a corrosion of the iron sheet takes place, the remnants of the reacting agents being perfectly removed from the detinned scraps. By this washing process the chlorid of iron is dissolved and by a subsequent flushing with alkaline lye the iron sheets are perfectly protected. This washing process with water and eventually a subsequent process of treatment with alkaline lye are known *per se* in a certain wet chemical process for the treatment of tin-plate waste with a solution of chlorid of iron, (see United States Patent No. 480,920;) but the difference between this process and ours is great and important, because in the wet treatment of sheet-metal waste referred to direct with chlorid of iron obviously the sheet-iron itself is attacked as well as the before-mentioned intermediate layer and causes corrosion. This takes place as the solution of chlorid of iron naturally attacks the iron very strongly; but the dry chlorid of iron which is formed in our dry chlorin process does not attack pure iron and therefore does not attack the sheet-iron.

It may be obvious to combine a wet sparation process with a wet washing process; but it is not at all obvious to combine a dry separation process in which the presence of any water has been carefully avoided with a washing process to succeed the dry separation process after all remnants of the acting agents are previously removed by an exhausting process or by an evacuating process.

To describe once more the process, we act as follows: After the separation of the tin has been completed and the last remains of the chlorid of tin have been evaporated and removed by the evacuation of the receptacle and when the last remains of chlorin which have not yet come into action are thus removed from the receptacle the bundles of iron are washed in water. This washing process is advantageously shortened by placing the bundles of iron first into a separate closed apparatus which is evacuated and into which water is then admitted. All intermediate spaces are now energetically flushed with water. This process may be repeated and the process may be carried out under alternating pressure. After the bundles have been in this manner sufficiently flushed with water they are dipped into a weak alkaline bath, and in this manner a thin protective layer of the salt used therein is formed. The sheet-iron thus receives a permanently bright steel-gray surface without any essential signs of corrosion.

Having thus fully described the nature of our invention, what we desire to secure by Letters Patent of the United States is—

1. Process of the recovery of detinned sheet-iron from tin-scrap or tin-plate, consisting in subjecting the tin-scrap or tinplate to the action of chlorin in a receptacle and removing the reagent and the chlorid of tin in a dry state and afterward washing the sheet-iron in water for removing the chlorid of iron adhering to the tin-scrap or tin-plate.

2. The process of the recovery of detinned sheet-iron from tin-scrap or tin-plate, consisting in subjecting the tin-scrap or tinplate to the action of chlorin in a receptacle, and removing the reagent and the chlorid of tin, and afterward washing the sheet-iron in water for removing the chlorid of iron adhering to the tin-scrap or tin-plate.

3. Process of the recovery of detinned sheet-iron from tin-scrap or tin-plate, consisting in subjecting the tin-scrap or tinplate in compressed state to the action of chlorin in a receptacle and removing the reagent and the gaseous products of the reaction by evacuating the receptacle and afterward washing the sheet-iron in water for removing the chlorid of iron.

4. Process of the recovery of detinned sheet-iron from tin-scrap or tin-plate, consisting in subjecting the tin-scrap or tinplate to the action of chlorin in a receptacle and removing the reagent and the gaseous products of the reaction and afterward washing the sheet-iron in water for removing the chlorid of iron and then subjecting it to the action of an alkaline solution.

5. Process of the recovery of detinned sheet-iron from tin-scrap or tin-plate, consisting in subjecting the tin-scrap or tinplate to the action of chlorin in a receptacle and removing the reagent and the gaseous products of the reaction in a dry state and afterward washing the sheet-iron in water for removing the chlorid of iron and then subjecting it to the action of an alkaline solution.

6. Process of the recovery of detinned sheet-iron from tin-scrap or tin-plate, consisting in subjecting the tin-scrap or tinplate to the action of chlorin in a receptacle and removing the reagent and the gaseous products of the reaction and afterward washing the sheet-iron by circulating water under pressure between the sheets for removing the chlorid of iron.

7. Process of the recovery of detinned sheet-iron from tin-scrap or tin-plate, consisting in subjecting the tin-scrap or tin-plate to the action of chlorin in a receptacle and removing the reagent and the gaseous products of the reaction and afterward washing the sheet-iron by circulating water under pressure between the sheets for removing the chlorid of iron and then subjecting it to the action of an alkaline solution.

8. Process of the recovery of detinned sheet-iron from tin-scrap or tin-plate, consisting in subjecting the tin-scrap or tin-plate to the action of chlorin gases in a receptacle and removing the reagent and the gaseous products of the reaction and afterward washing the sheet-iron in water for removing the chlorid of iron.

9. Process of the recovery of detinned sheet-iron from tin-scrap or tin-plate, consisting in subjecting the tin-scrap or tin-plate to the action of chlorin gases in a receptacle and removing the reagent and the gaseous products of the reaction in a dry state and afterward washing the sheet-iron in water for removing the chlorid of iron.

10. Process of the recovery of detinned sheet-iron from tin-scrap or tin-plate, consisting in subjecting the tin-scrap or tin-plate in compressed state to the action of chlorin gases in a receptacle and removing the reagent and the gaseous products of the reaction by exhausting the receptacle and afterward washing the sheet-iron in water for removing the chlorid of iron.

11. Process of the recovery of detinned sheet-iron from tin-scrap or tin-plate, consisting in subjecting the tin-scrap or tin-plate to the action of chlorin gases in a receptacle and removing the reagent and the gaseous products of the reaction and afterward washing the sheet-iron in water for removing the chlorid of iron and then subjecting it to the action of an alkaline solution.

12. Process of the recovery of detinned sheet-iron from tin-scrap or tin-plate, consisting in subjecting the tin-scrap or tin-plate to the action of chlorin gases in a receptacle and removing the reagent and the gaseous products of the reaction in a dry state and afterward washing the sheet-iron in water for removing the chlorid of iron and then subjecting it to the action of an alkaline solution.

13. Process of the recovery of detinned sheet-iron from tin-scrap or tin-plate, consisting in subjecting the tin-scrap or tin-plate to the action of chlorin gases in a receptacle and removing the reagent and the gaseous products of the reaction and afterward washing the sheet-iron by circulating water under pressure between the sheets for removing the chlorid of iron.

14. Process of the recovery of detinned sheet-iron from tin-scrap or tin-plate, consisting in subjecting the tin-scrap or tin-plate to the action of chlorin gases in a receptacle and removing the reagent and the gaseous products of the reaction and afterward washing the sheet-iron by circulating water under pressure between the sheets for removing the chlorid of iron and then subjecting it to the action of an alkaline solution.

In witness whereof we have hereunto set our hands in the presence of two witnesses.

KARL GOLDSCHMIDT.
JOSEF WEBER.

Witnesses:
WILLIAM ESSENWEIN,
H. SCHUCHARDS.